United States Patent [19]

Chang et al.

[11] Patent Number: 5,270,523
[45] Date of Patent: Dec. 14, 1993

[54] PLATE SPRING FOR MOUNTING A MAGNETIC STRIPE CARD READER'S MAGNETIC HEAD

[75] Inventors: Yeng-Ming Chang, Taipei; Andrew Tsai, Kao Hsiung, both of Taiwan

[73] Assignee: Uniform Industrial Corp., Taipei, Taiwan

[21] Appl. No.: 828,163

[22] Filed: Jan. 30, 1992

[51] Int. Cl.⁵ .................... G06K 7/08; G11B 5/48; G11B 5/58
[52] U.S. Cl. ........................... 235/449; 360/2; 360/104; 360/109
[58] Field of Search ............... 235/449; 360/2, 104, 360/109

[56] References Cited

U.S. PATENT DOCUMENTS 4,591,937 5/1986 Nakarai et al. .................. 360/2
4,646,181 2/1987 Morigaki ........................ 360/2

FOREIGN PATENT DOCUMENTS 142521 6/1986 Japan ........................ 360/104

Primary Examiner—Davis L. Willis
Assistant Examiner—Yu S. Lin
Attorney, Agent, or Firm—Jacobson, Price, Holman & Stern

[57] ABSTRACT

For mounting a magnetic stripe card reader's magnetic head, a plate spring made from a thin metal sheet having two opposite fixing wings bilaterally extending outwards from a square frame and longitudinally aligned with each other, wherein said square frame has two raised portions on a bottom edge thereof longitudinally aligned with the center line of said two opposite fixing wings and stopped against a magnetic head held therein. By means of a line contact, the magnetic head is automatically rotated to the best reading position against a magnetic stripe card to be read.

1 Claim, 4 Drawing Sheets

PLATE SPRING FOR MOUNTING A MAGNETIC STRIPE CARD READER'S MAGNETIC HEAD

BACKGROUND OF THE INVENTION

The present invention relates to a fastening plate spring for mounting a magnetic stripe card reader's magnetic head and relates more particularly to such a plate spring used in fixing the magnetic head of a magnetic stripe card reader permitting it to be automatically adjusted to the best reading position against the magnetic stripe card.

For securing a card reader magnetic head to a magnetic head holder, a plate spring is commonly used. This plate spring is made from a thin metal sheet, as shown in FIGS. 1 and having two opposite fixing wings bilaterally extending outwards from a square frame. Once a magnetic head is secured to a magnetic head holder by a plate spring, its angle position is fixed. The slot on the card reader, as shown in FIGS. 1 and 2, is commonly wider than the thickness of a magnetic stripe card to be read. Therefore, the contact situation between the magnetic head and a magnetic stripe card may be disposed in an inclined position (instead of the best reading position as shown in FIG. 6), so if a magnetic card is not properly inserted into the slot, then the magnetic read head is not in its best reading position, causing a reading error.

SUMMARY OF THE INVENTION

The present invention has been accomplished to eliminate the aforesaid problems. It is therefore the main object of the present invention to provide a plate spring used in mounting a card reader's magnetic head which permits a magnetic head to be automatically adjusted to the best reading position as shown in FIG. 6 upon insertion of a magnetic stripe card.

A plate spring in accordance with the present invention is made from a thin metal sheet having two opposite fixing wings bilaterally extending outwards from a square frame. The two opposite fixing wings are longitudinally aligned of which each has a hole for mounting. The square frame has two raised portions on a bottom edge thereof longitudinally aligned with the center line of the two opposite fixing wings. Once the plate spring has been fastened to a magnetic head holder for holding firmly a magnetic head, the two raised portions are pressed against the magnetic head. Therefore, the magnetic head is secured to the plate spring through a line contact and can be automatically rotated to the best reading position as shown in FIG. 6 by a magnetic stripe card to be read.

DETAILED DESCRIPTION OF THE PREFERRED EMBODIMENT

Figure 3:
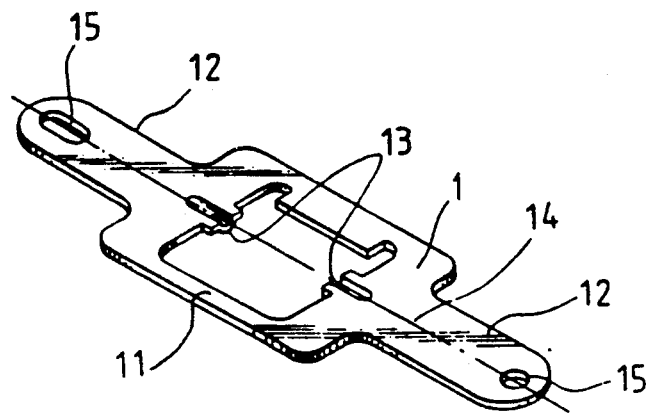
FIG. 3 is a perspective view of a fastening plate spring embodying the present invention.
Figure 6:
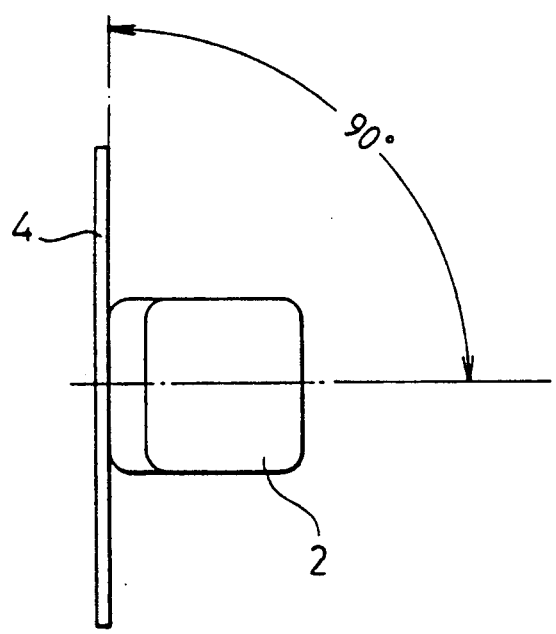
FIG. 6 is a sectional view showing the best reading position of the magnetic head related to the magnetic stripe card to be read.

Referring to FIG. 6, according to magnetics theory (Faraday's Law), a magnetic head 2 is in its best reading position against the megnetic stripe card 4, when the center line of the head 2 is at right angle to the magnetic stripe card 4 to be read. Referring to FIG. 3, a plate spring is made from a thin metal sheet having two opposite fixing wings 12 bilaterally extending outwards from a square frame 11 and longitudinally aligned with each other. The two opposite fixing wings 12 each has a hole 15 for mounting. Two elongated, raised portions 13 are made on the bottom edge of the square frame 11 at two opposite locations longitudinally aligned with the center line 14 of the fixing wings 12.

Figure 1:
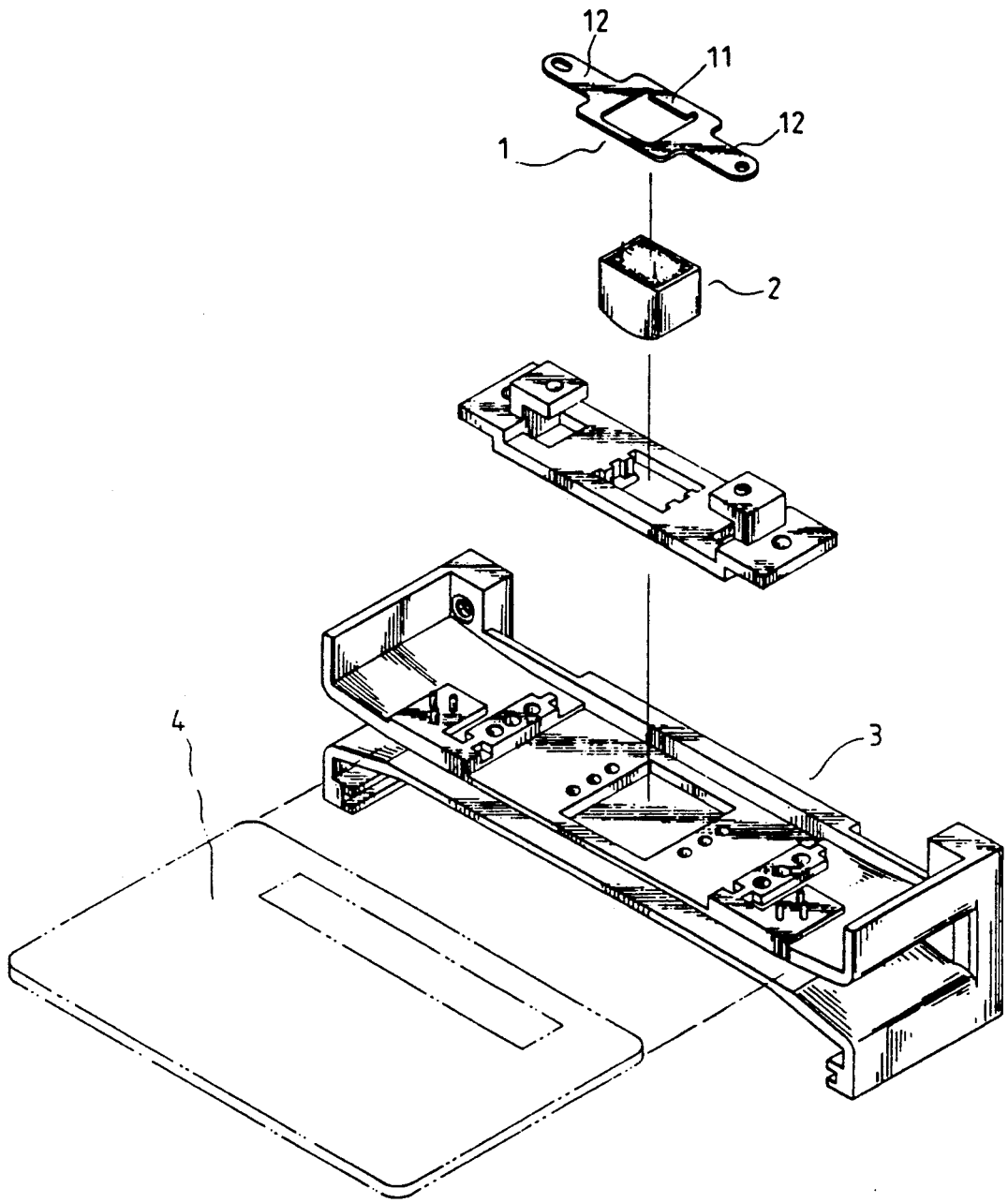
FIG. 1 is an exploded view of the magnetic head assembly of a card reader according to the prior art.
Figure 2:
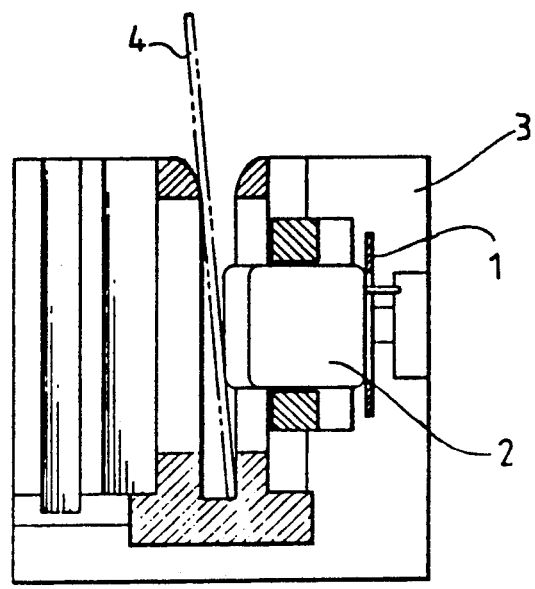
FIG. 2 is a sectional assembly view of the magnetic head assembly of FIG. 1.
Figure 5:
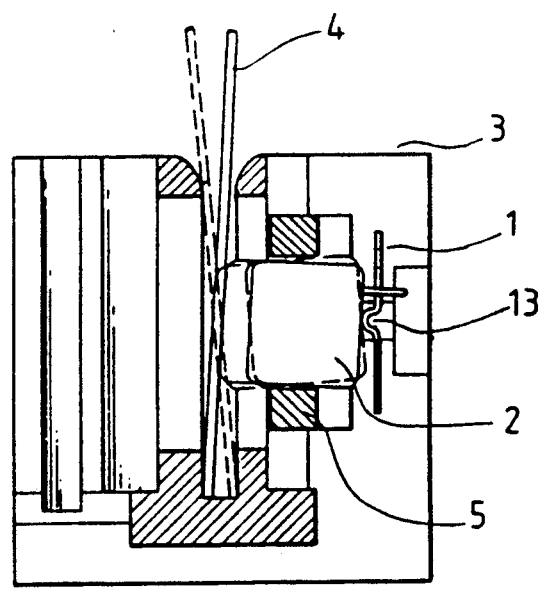
FIG. 5 is a sectional assembly view of the magnetic head assembly of FIG. 4.
Figure 4:
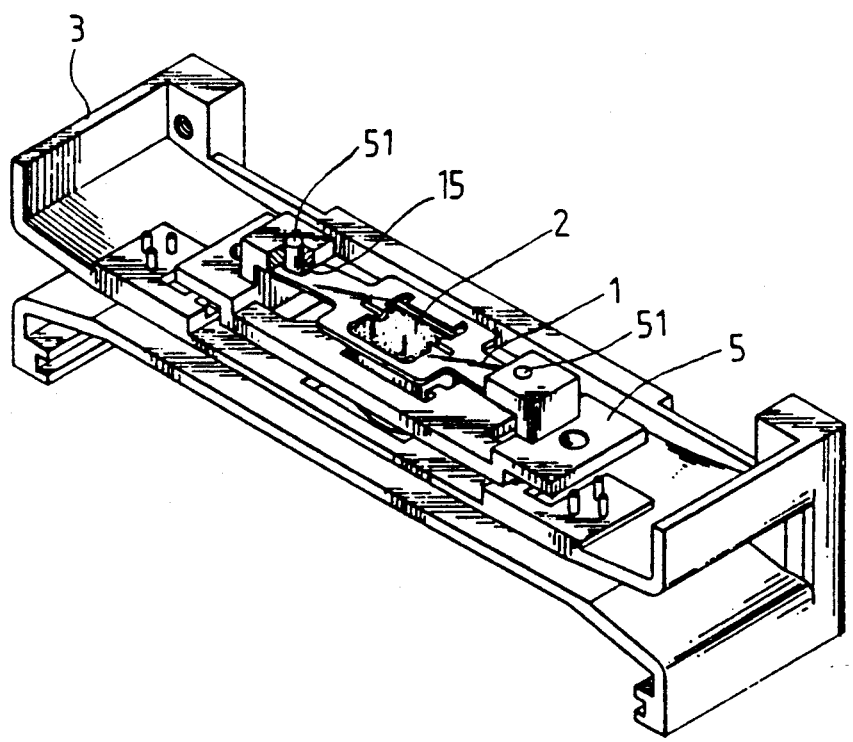
FIG. 4 is an elevational view of a magnetic head assembly showing that the magnetic head is secured in place by the fastening plate spring of FIG. 3.

Referring to FIGS. 4 and 5, the plate spring is secured to a seat 5 on a magnetic head holder to hold a magnetic head 2 in place. As illustrated, the holes 15 on the two opposite fixing wings 12 are respectively mounted on two pins 51 on the seat 5 and, the two elongated, raised portions 13 are stopped against the magnetic head 2. Therefore, the magnetic head 2 is retained in a line contact status against the plate spring and can be automatically rotated to the best reading position against a magnetic stripe card 4 according to its angle of incidence (see FIG. 5).

What is claimed is:

1. For mounting a magnetic stripe card reader's magnetic head, a plate spring made from a thin metal sheet having two opposite fixing wings bilaterally extending outwards from a square frame and longitudinally aligned with each other, and characterized in that said square frame has two opposite raised portions on a bottom edge thereof longitudinally aligned with the center line of said two opposite fixing wings.

* * * * *